(12) United States Patent
Lum

(10) Patent No.: US 7,890,658 B2
(45) Date of Patent: Feb. 15, 2011

(54) DYNAMIC ADDRESS ASSIGNMENT FOR ACCESS CONTROL ON DHCP NETWORKS

(75) Inventor: Stacey C. Lum, Los Altos, CA (US)

(73) Assignee: InfoExpress, Inc., Mountain View, CA (US)

(*) Notice: Subject to any disclaimer, the term of this patent is extended or adjusted under 35 U.S.C. 154(b) by 0 days.

(21) Appl. No.: 12/550,321

(22) Filed: Aug. 28, 2009

(65) Prior Publication Data

US 2010/0005506 A1 Jan. 7, 2010

Related U.S. Application Data

(63) Continuation of application No. 11/227,679, filed on Sep. 14, 2005, now Pat. No. 7,590,733.

(51) Int. Cl.
*G06F 15/173* (2006.01)
*G06F 15/177* (2006.01)

(52) U.S. Cl. .................. 709/245; 709/201; 709/228; 709/229; 709/226; 709/220; 709/225; 709/223; 726/12; 726/2; 726/1; 726/3; 713/153; 713/168; 713/150; 370/401; 370/328; 370/331; 370/338

(58) Field of Classification Search .......... 709/245, 709/201, 228, 229, 226, 220, 225, 223
See application file for complete search history.

(56) References Cited

U.S. PATENT DOCUMENTS

| | | | |
|---|---|---|---|
| 1,830,383 A | 11/1931 | Bos | |
| 1,860,326 A | 5/1932 | Jackson | |
| 2,131,067 A | 9/1938 | Paden | |
| 2,247,592 A | 7/1941 | Swift | |
| 2,519,435 A | 8/1950 | Byrd, Jr. | |
| 2,731,056 A | 1/1956 | Anson | |
| 3,100,664 A | 8/1963 | Duval | |
| 3,701,557 A | 10/1972 | Centofante | |
| 4,181,339 A | 1/1980 | Rigsby | |
| 4,951,984 A | 8/1990 | Huang | |

(Continued)

FOREIGN PATENT DOCUMENTS

JP 2005079706 3/2005

(Continued)

OTHER PUBLICATIONS

"Packet Fence Overview," PacketFence™, located at http://www.packetfence.org.

(Continued)

*Primary Examiner*—Jude J Jean Gilles
(74) *Attorney, Agent, or Firm*—Carr & Ferrell LLP

(57) ABSTRACT

Systems and methods of managing security on a computer network are disclosed. The computer network includes a restricted subnet and a less-restricted subnet. Access to the restricted subnet is controlled by a network filter, optionally inserted as a software shim on a DHCP server. In some embodiments, the network filter is configured to manipulate relay IP addresses to control whether the DHCP server provides, in a DHCPOFFER packet, an IP address that can be used to access the restricted subset. In some embodiments, configuration information is communicated between the DHCP server and the network filter via DHCPOFFER packets.

19 Claims, 4 Drawing Sheets

U.S. PATENT DOCUMENTS

| | | | |
|---|---|---|---|
| 5,010,622 A | 4/1991 | Morita | |
| 5,606,668 A | 2/1997 | Shwed | |
| 5,701,635 A | 12/1997 | Hawkes | |
| 5,835,481 A | 11/1998 | Akyol et al. | |
| 5,842,002 A | 11/1998 | Schnurer et al. | |
| 5,852,722 A | 12/1998 | Hamilton | |
| 5,944,368 A * | 8/1999 | Hastings | 292/251.5 |
| 5,950,195 A | 9/1999 | Stockwell et al. | |
| 5,968,176 A | 10/1999 | Nessett et al. | |
| 6,006,259 A * | 12/1999 | Adelman et al. | 709/223 |
| 6,044,402 A * | 3/2000 | Jacobson et al. | 709/225 |
| 6,119,162 A | 9/2000 | Li et al. | |
| 6,304,973 B1 | 10/2001 | Williams | |
| 6,363,489 B1 | 3/2002 | Comay et al. | |
| 6,393,484 B1 | 5/2002 | Massarani | |
| 6,671,737 B1 | 12/2003 | Snowdon et al. | |
| 6,678,835 B1 | 1/2004 | Shah et al. | |
| 6,745,333 B1 | 6/2004 | Thomsen | |
| 6,769,000 B1 | 7/2004 | Akhtar et al. | |
| 6,834,414 B2 | 12/2004 | Chiu | |
| 6,988,133 B1 | 1/2006 | Zavalkovsky et al. | |
| 7,055,173 B1 | 5/2006 | Chaganty et al. | |
| 7,299,294 B1 | 11/2007 | Bruck et al. | |
| 7,350,226 B2 | 3/2008 | Moriconi et al. | |
| 7,469,418 B1 | 12/2008 | Wilkinson et al. | |
| 7,523,484 B2 | 4/2009 | Lum et al. | |
| 7,590,733 B2 * | 9/2009 | Lum | 709/225 |
| 2002/0010869 A1 | 1/2002 | Kim | |
| 2002/0023273 A1 | 2/2002 | Song | |
| 2002/0029276 A1 | 3/2002 | Bendinelli et al. | |
| 2002/0073337 A1 | 6/2002 | Ioele et al. | |
| 2002/0120749 A1 | 8/2002 | Widegren et al. | |
| 2003/0012205 A1 | 1/2003 | Foti et al. | |
| 2003/0023880 A1 | 1/2003 | Edwards et al. | |
| 2003/0046586 A1 | 3/2003 | Bheemarasetti et al. | |
| 2003/0126464 A1 | 7/2003 | McDaniel et al. | |
| 2003/0131262 A1 | 7/2003 | Goddard | |
| 2003/0191966 A1 | 10/2003 | Gleichauf | |
| 2003/0208694 A1 | 11/2003 | Fang | |
| 2004/0010719 A1 | 1/2004 | Daenen | |
| 2004/0024885 A1 | 2/2004 | Bush, III et al. | |
| 2004/0054926 A1 | 3/2004 | Ocepek et al. | |
| 2004/0098610 A1 | 5/2004 | Hrastar | |
| 2004/0103314 A1 | 5/2004 | Liston | |
| 2004/0162994 A1 | 8/2004 | Cohen et al. | |
| 2004/0181690 A1 | 9/2004 | Rothermel et al. | |
| 2004/0193912 A1 | 9/2004 | Li et al. | |
| 2004/0243835 A1 | 12/2004 | Terzis et al. | |
| 2005/0027837 A1 | 2/2005 | Roese et al. | |
| 2005/0044197 A1 | 2/2005 | Lai | |
| 2005/0050365 A1 | 3/2005 | Seki et al. | |
| 2005/0081058 A1 | 4/2005 | Chang et al. | |
| 2005/0278775 A1 | 12/2005 | Ross | |
| 2006/0050703 A1 | 3/2006 | Foss | |
| 2006/0089938 A1 | 4/2006 | Leonard et al. | |
| 2006/0095968 A1 | 5/2006 | Portolani et al. | |
| 2006/0147043 A1 | 7/2006 | Mann et al. | |
| 2006/0161970 A1 | 7/2006 | Hopen et al. | |
| 2006/0164199 A1 | 7/2006 | Gilde et al. | |
| 2007/0064689 A1 | 3/2007 | Shin et al. | |
| 2007/0112574 A1 | 5/2007 | Greene | |
| 2007/0157306 A1 | 7/2007 | Elrod et al. | |
| 2008/0060067 A1 | 3/2008 | Kim et al. | |
| 2008/0209044 A1 | 8/2008 | Forrester | |
| 2009/0043765 A1 | 2/2009 | Pugh | |

FOREIGN PATENT DOCUMENTS

WO    2006/029217 A2    3/2006

OTHER PUBLICATIONS

"Network Access Control from Mirage Networks," Mirage Networks, 2006.

Whalen, S., "An Introduction to ARP Spoofing," Apr. 2001, Revision 1.82, located at http://www.node99.org/projects/arpspoof/.

* cited by examiner

DYNAMIC ADDRESS ASSIGNMENT FOR ACCESS CONTROL ON DHCP NETWORKS

CROSS-REFERENCE TO RELATED APPLICATIONS

This patent application is a continuation and claims the priority benefit of U.S. patent application Ser. No. 11/227,679 filed Sep. 14, 2005 now U.S. Pat. No. 7,590,733, and entitled "Dynamic Address Assignment For Access Control on DHCP Networks," the disclosure of which is incorporated herein by reference.

BACKGROUND

Networks commonly use the Dynamic Host Configuration Protocol (DHCP) to assign and manage internet protocol (IP) addresses in networks. Typically, the DHCP service is provided by DHCP server software on a computing device referred to as a DHCP server. When a new endpoint (e.g., PC or notebook computer) attaches to a network, the endpoint broadcasts a "DHCPDISCOVER" packet to initiate contact with a DHCP server and obtain dynamic assignment of an IP address. The DHCPDISCOVER packet includes the Media Access Control (MAC) address of the endpoint.

If there is no DHCP server to receive the broadcast on a local segment to which the endpoint is attached, the DHCPDISCOVER packet may be relayed between networks by a DHCP relay, which may be present in a router, network appliance, or other device on the local segment. If this occurs, the DHCP relay will add its own relay IP address to the DHCPDISCOVER packet so that DHCP servers will be able to send a reply to the endpoint back through the DHCP relay.

When a DHCP server receives a DHCPDISCOVER packet, the DHCP server responds with a "DHCPOFFER" packet. The DHCPOFFER packet includes a proposed IP address and the DHCP server stores a record associating the proposed IP address with a MAC address of the endpoint. Several DHCP servers may receive a copy of the same DHCPDISCOVER packet and each DHCP server my respond with a "DHCPOFFER" packet.

When an endpoint receives one or more DHCPOFFER packets it can accept one of the received DHCPOFFERs by broadcasting a "DHCPREQUEST" containing the desired IP address. The DHCP server that sent the corresponding DHCPOFFER packet will then respond with a "DHCPACK" packet, which assigns the associated IP address to the endpoint.

The IP address included in a DHCPOFFER packet is selected from one or more address range(s) in a matching "scope." A scope contains a range of IP addresses and a set of criteria. The criteria are optionally compared with data (e.g., DHCP options) within a DHCPDISCOVER packet in order to determine which scope(s) to select an IP address from for inclusion is a resulting DHCPOFFER packet. Thus, on set of DHCP options in a DHCPDISCOVER packet may result in selection of an IP address from a first scope and a different set of DHCP options in a DHCPDISCOVER packet may result in selection of an IP address from a second scope. The scopes are stored in an address allocation table in association with the DHCP server. Some, none, or all of the IP addresses within a scope may be available depending on whether the addresses have been previously assigned to other endpoints.

Upon receiving the DHCPDISCOVER packet, the DHCP server must determine which scope to select an unused IP address from, based on one or more criteria (e.g., DHCP options). The specific criteria available for selecting scopes varies depending on DHCP server implementations, but the scopes are assigned based on the contents of the DHCPDISCOVER packet. The criteria may include a Relay IP address or lack thereof.

A Relay IP address is inserted into DHCPDISCOVER and DHCPREQUEST packets by a DHCP relay before relaying the packets. The Relay IP address ensures the DHCP server knows where to send the responses. DHCP relays are used on segments where DHCP servers are not present. When a DHCPDISCOVER or DHCPREQUEST packet lacks a Relay IP address, this indicates that the DHCP server received the packet from a local segment, without going through a DHCP relay. This implies that the DHCP server should use the local scope associated with one of its network interface cards.

Many models of routers and switches can be configured to selectively block network packets originating from endpoints. The selective blocking of endpoint traffic, also known as filtering, is based on the contents of the packet and its origination. The contents may include source and destination IP address, protocol (e.g. IGMP, ICMP, TCP, UDP, . . . ), the port number (TCP or UDP port number), and other fields within the packet. However, setup and management of these blocking features is a laborious non-dynamic task and may require undesirable changes in infrastructure. There is, therefore, a need for improved methods of selectively blocking network packets.

SUMMARY OF THE INVENTION

The invention includes a secure network having at least a restricted subset and a less-restricted subset. Access to the restricted subset is available to endpoints that have satisfied an assessment (e.g., a security evaluation or audit). Access to the less-restricted subset is less restricted and may be available to devices that have not yet satisfied an assessment. The less-restricted subset typically includes one or more devices configured for performing the assessment. Thus, an endpoint may initially access the less-restricted subset and, using the less-restricted subset, may undergo an assessment that allows access to the restricted subset. The assessment may include a security audit, user identification, or the like, as further described herein.

Endpoint access to the restricted subset and less-restricted subset are controlled using one or more access control lists of a router, switch, or other network device. The access control lists are configured such that endpoints having an IP address within a first range have access to the less-restricted subset and not the restricted subset, and endpoints having an IP address within a second range have access to the restricted subset. These first and second IP address ranges are optionally defined as separate subnets on the same network segment, as subnets spanning different network segments, or combinations thereof. These subnets are referred to herein as the restricted subnet and less-restricted subnet to respectively indicate their association with the restricted subset and less-restricted subsets of the protected network. An endpoint may be moved from a first subnet to a second subnet by changing the IP address of the endpoint. Thus, access to the restricted subset may be controlled by assigning an appropriate IP address to the endpoint from the restricted subnet. Additional subnets, in addition to the first and second subnets, can be specified to define additional restricted subsets and less-restricted subsets on the network.

In some embodiments, assignment of the restricted subnet to endpoints, and thereby access to the restricted subset, is controlled by setting the proper combination of DHCP option parameters and values that may be included in a DHCPDIS- COVER packet as received by a DHCP server. These parameters and values are set by a network filter associated with the DHCP server. In these embodiments, a DHCP server contains scopes that specify a range of IP addresses. The network filter inserts or modifies the option parameter responsive to whether or not the endpoint has passed an assessment. As a result, the DHCP server selects the appropriate scope such that an endpoint that has not passed an assessment is assigned an IP address within the less-restricted subnet, while an endpoint that has passed the assessment is assigned an IP address from the restricted subnet. The network filter is optionally installed on the computing device running the DHCP server, and is capable of modifying received DHCP packets (e.g. DHCPDISCOVER and DHCPREQUEST) before they are otherwise processed by the DHCP server. In some embodiments, the network filter is also configured to modify packets sent by the DHCP server (e.g. DHCPOFFER and DHCPACK) before they are transmitted to the network.

The network filter is software, hardware, or firmware logically disposed between that part of the DHCP server that processes DHCP packets and an external network, such that DHCP packets pass through the network filter when communicated between the part of the DHCP server that processes DHCP packets and the external network. The network filter may be included on the DHCP server or between the DHCP server and the external network. The use of a network filter associated with a DHCP server results in a scalable system and does not require any changes to the physical network topology or addition of external servers. In some embodiments, the network filter includes a software shim. In some embodiments, the network filter includes a device placed between ports of the DHCP server and the network.

By changing the DHCP option in DHCPDISCOVER packets, the network filter can control which address is assigned to the endpoint, and therefore what resources the endpoint can access when used in conjunction with the access control list created on the router. The router access control list is configured such that IP addresses within the less-restricted subnet are only allowed access to elements of the less-restricted subset and IP addresses within the restricted subnet are allowed access to the elements of the restricted subset.

In some embodiments, the assignment to the restricted subnet and less-restricted subnet is controlled by the network filter, through manipulations of the relay IP address in a DHCPDISCOVER packet. In these embodiments, the network filter alters the relay IP address within DHCPDISCOVER packet to control which subnet the DHCP server will assign to the endpoint. The network filter selects the relay IP address based on whether the endpoint has been assessed to meet certain requirements. If the requirements have not been satisfied, the IP address of the DHCPDISCOVER packet is modified by the network filter so the DHCP server assigns a less-restricted subnet address to the endpoint. If the assessment indicates the requirements have been satisfied, the network filter sets the relay IP address in DHCPDISCOVER packet such that the DHCP server assigns an IP address from the restricted subnet to the endpoint.

In order to assign an appropriate IP relay address (or DHCP option) the network filter must have access to configuration information regarding which relay IP addresses will cause the DHCP server to assign an appropriate IP address. This may be accomplished by storing a copy of this information in a location accessible to the network filter. However, storing multiple copies of this information my increase administrative overhead. For example, if the DHCP server configuration is modified, then the update must be propagated to each local copy. This may particularly be a problem if the related configuration is managed by separate programs. Storing related configurations from different programs increases the likelihood of configuration errors, makes configuration harder, and is difficult to keep synchronized. In some embodiments, to avoid the problems associated with managing the network filter and DHCP server configurations separately for restricted and less-restricted subnets, configuration information is stored in the DHCP server configuration program or files, without storing the same configuration information on the network filter. Thus, separate subnet-specific configuration information need not be stored in association with the network filter. By using only standard DHCP configuration tools to store and manage configuration information associated with access criteria and network access configuration information (e.g., ACCESS CRITERIA), management complexity is greatly reduced. ACCESS CRITERIA may include which relay IP addresses may be assigned to endpoints having passed an assessment, information configured to manipulate DHCP packets to control access to the less-restricted and restricted subnets, and/or which endpoint addresses can bypass some or all assessments.

In some embodiments, reserved DHCP option parameters are used to convey configuration information, such as that discussed above, between a DHCP server and network filter. The conveyed configuration information may be relating to restricted and less-restricted subnets and may include ACCESS CRITERIA. In some embodiments, the DHCP option parameters used to convey this configuration information are included in DHCPOFFER packets. In these embodiments, the network filter monitors DHCPOFFER packets and when it finds one addressed to an endpoint which has not met assessment requirements and which contains the reserved DHCP option(s) indicating the endpoint is subject to assessment, the network filter extracts and saves the endpoint MAC, Relay IP address, and other ACCESS CRITERIA, then blocks (e.g., prevents communication of) the DHCPOFFER packet. When the network filter receives a subsequent DHCPDISCOVER packet which contains the same MAC address and Relay IP address that was previously saved, it modifies the DHCPDISCOVER packet to obtain the less-restricted subnet (e.g. modifies the relay IP address or adds an option depending on the ACCESS CRITERIA) if the endpoint has still not met the audit requirements. This causes the DHCP server to assign the less-restricted subnet to the endpoint. If the endpoint meets the assessment requirements at a later time, the network filter lets the DHCPDISCOVER packet and the DHCPOFFER packet pass through without these alterations. To ensure that the DHCP server will provide the DHCP options containing the ACCESS CRITERIA in the DHCPOFFER, the network filter inserts a request for reserved DHCP options into all received DHCPDISCOVER packets.

DETAILED DESCRIPTION

Figure 1:
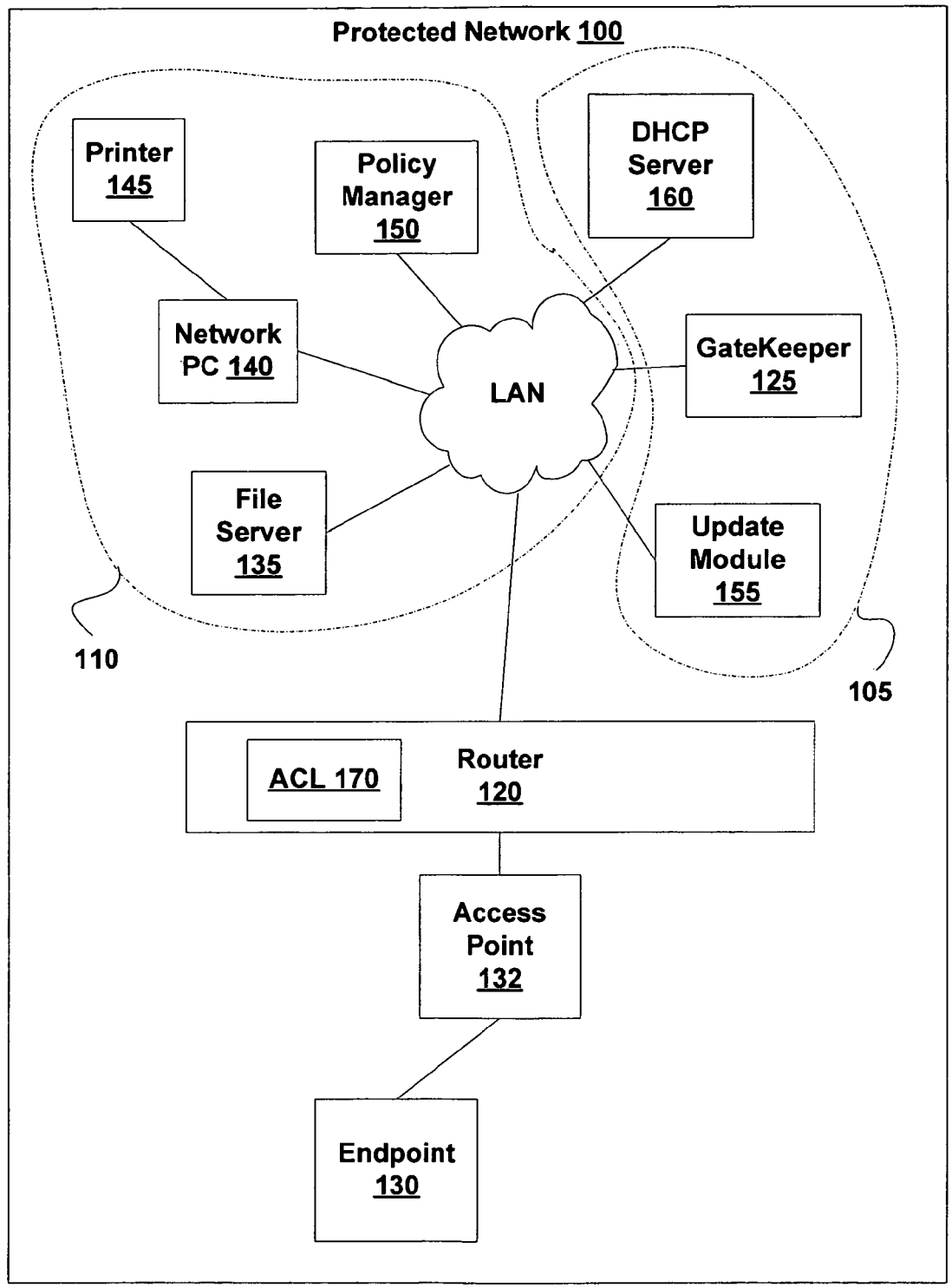
FIG. 1 is a block diagram of a protected network according to various embodiments of the invention.

FIG. 1 is a block diagram of a Protected Network 100, according to various embodiments of the invention. Protected Network 100 is either physically or logically divided into a Less-Restricted Subset 105 and a Restricted Subset 110. Access to Protected Network 100 is possible through an optional Access Point 132 and a DHCP relay such as a Router 120. As is described further herein, this access is under the control of a GateKeeper 125. GateKeeper 125 is configured to enforce a security policy against one or more Endpoint 130 requesting access to Restricted Subset 110. Typically, Restricted Subset 110 and Less-Restricted Subset 105 are characterized by an access control list ACL 170 within Router 120. Endpoint 130, Access Point 132 and Router 120 are connected by communication channels such as a cable, a local area network, the Internet, a telephone network, other computing network, and/or the like. In some embodiments, Access Point 132 is a network access server, a switch, a wireless access point, a virtual private network interface, a hub, a router, or the like.

In various embodiments, Protected Network 100 includes a commercial network, corporate network, telephone network, private network, local area network, wide area network, wireless network, communication network, government network, university network, and/or the like. Less-Restricted Subset 105 is optionally a subset of Protected Network 100 including at least GateKeeper 125. Less-Restricted Subset 105 further includes a DHCP Server (dynamic host configuration protocol server) 160 configured to manage and assign network addresses to Endpoint 130. In some embodiments, Less-Restricted Subset 105 further includes an Update Module 155 configured for providing security updates to an agent on Endpoint 130. For example, in one embodiment, Less-Restricted Subset 105 includes a first server configured to function as DHCP Server 160 and a second server configured to function as GateKeeper 125. In one embodiment, Less-Restricted Subset 105 includes a single computing device configured to function as both Update Module 155 and GateKeeper 125.

Restricted Subset 110 includes those elements of Protected Network 100 not included in Less-Restricted Subset 105. Restricted Subset 110 optionally includes devices such as a File Server 135, a Network PC 140, a Printer 145, or the like. In some embodiments, Protected Network 100 includes elements having a hierarchy of access restrictions. For example, access to Network PC 140 may require a higher level of authority than access to File Server 135. In this case, as described further herein, access control lists within Router 120 are used to independently control access to specific devices within Restricted Subset 110. Protected Network 100 may be large, including tens, hundreds, or thousands of devices. In various embodiments, Router 120 may be considered part of Less-Restricted Subset 105 or Restricted Subset 110.

GateKeeper 125 is configured to apply a security assessment to an instance of Endpoint 130 before allowing access to Restricted Subset 110. The security assessment may include requirements for user identification such as user names and passwords, configuration requirements relating to the configuration of Endpoint 130, application requirements relating to applications running on Endpoint 130, or the like. For example, in one embodiment GateKeeper 125 is configured to require a user of Endpoint 130 to provide a username and password, require Endpoint 130 to be running an operating system with specific security patches, require that Endpoint 130 not be connected to any insecure devices, and/or require that Endpoint 130 have current antivirus software installed.

In some embodiments, GateKeeper 125 is configured to assess compliance with several alternative access configurations having different levels of requirements, and to determine which configuration to provide based on the identity of Endpoint 130, the identity of a user of Endpoint 130, those elements of Restricted Subset 110 to which access is requested, and/or the like. For example, a request to access File Server 135 may have to satisfy a configuration assessment that includes scanning Endpoint 130 for malicious code, while a request to access Printer 145 may have to satisfy an assessment that includes establishing a user identity. Assessments may be performed by scanning endpoints, making remote calls on endpoints, or by communicating to an agent running on the endpoint through the Less-Restricted Subset 105.

In some embodiments, a single instance of GateKeeper 125 is configured to assess multiple endpoints residing on more than one Access Point 132, traversing through more than one Router 120 and/or accessing more than one Protected Network 100. As is described further herein, access to Restricted Subnet 110 is controlled, in part, by setting access control lists within Router 120. In some embodiments, Protected Network 100 includes a plurality of Router 120, a plurality of Access Points 132, a plurality of GateKeeper 125 and/or a plurality of Less-Restricted Subset 105. Further details of GateKeeper 125 and Router 120 are discussed elsewhere herein.

Endpoint 130 is a computing device configured to operate as an end point (EP) in a communication channel including Router 120, Access Point 132, and Endpoint 130. In various embodiments, Endpoint 130 is a personal computer, a personal digital assistant, a telephone, a wireless device, a communication device such as another router, an Ethernet card, a wireless card, another access point, a network device, a terminal, or the like. Endpoint 130 is identified by a MAC address, and optionally by a cookie, by data stored on Endpoint 130, by a user name, an IP address, a network address, or the like.

In typical embodiments, Endpoint 130 is configured to execute a software and/or hardware agent for communicating with GateKeeper 125, and to make requests for new IP addresses following an assessment or responsive to an event related to security. For example, in one embodiment, Endpoint 130 includes an agent configured to monitor code running on Endpoint 130 and report any suspicious code to GateKeeper 125. In another example, Endpoint 130 may include software and/or hardware configured to monitor other devices connected to Endpoint 130 and to report information about these devices (e.g., their security statuses or MAC addresses) to GateKeeper 125. In another example, Gatekeeper may scan Endpoint 130 independently of whether an agent is running on Endpoint 130.

Policy Manager 150 is configured to centrally create, update, and distribute security policies enforced by one or more GateKeeper 125. For example, in various embodiments, Policy Manager 150 is configured to manage passwords, to specify access privileges, to specify requirements of security policies, or the like. In some embodiments, Policy Manager 150 is configured to establish several security policies and to specify conditions under which each of the security policies should be used. For example, a security policy may be selected for use responsive to a device type of Endpoint 130 and/or the elements of Protected Network 100 to which access has been requested.

Optional Update Module 155 is configured for remotely modifying Endpoint 130, or a device connected to Endpoint 130, in order to improve compliance with a security policy. For example, if it is found that Endpoint 130 includes out-of-date antivirus software, then Update Module 155 may facilitate updating of the antivirus software on Endpoint 130. In some embodiments, Update Module 155 is configured to update an agent executing on Endpoint 130. Update Module 155 is optionally included in Restricted Subset 110 or external to Protected Network 100. Update Module 155 optionally operates responsive to a security policy and/or to GateKeeper 125.

Figure 2:
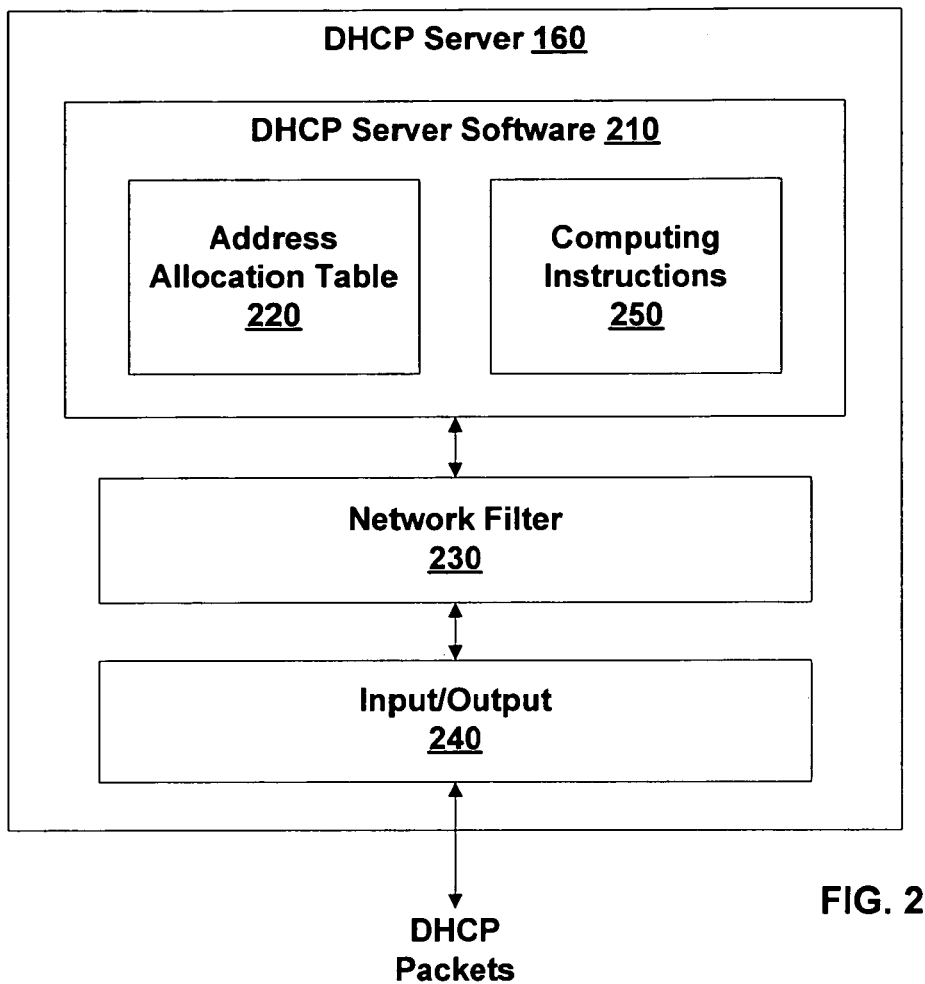
FIG. 2 is a block diagram of a DHCP server according to various embodiments of the invention.

FIG. 2 is a block diagram of DHCP Server 160 according to various embodiments of the invention. DHCP Server 160 includes an optional Network Filter 230, and Input/Output 240, and DHCP Server Software 210 including an Address Allocation Table 220 and Computing Instructions 250. Address Allocation Table 220 includes a table of scopes, whose IP address ranges may be assigned to Endpoint 130. In various embodiments, DHCP Server Software 210 may include hardware or firmware in addition to, or instead of, software. DHCP Server Software 210 is optionally operative independently from Network Filter 230 for the provision of DHCP services. Thus, in some embodiments, DHCP Server Software 210 and Network Filter 230 are separate (e.g., distinct or independent) systems. In some embodiments, DHCP Server Software 210 and Network Filter 230 are installed on different hardware devices.

In general, there are at least two classes of scopes, those whose IP addresses may be assigned to an instance of Endpoint 130 that has passed an assessment and those whose IP addresses are assigned to instances of Endpoint 130 that has not yet passed an assessment. These scopes are referred to as restricted and less-restricted scopes, respectively. In some embodiments, for each restricted scope that requires assessment, at least one less-restricted scope is defined. The IP addresses within the less-restricted scope includes addresses that, as specified by ACL 170 of Router 120, may communicate with devices on the less-restricted subnet, e.g., the Less-Restricted Subset 105, but not devices on the restricted subnet. Likewise, the IP address within the restricted scope includes address that, as specified by ACL 170 may communicate with devices on the restricted subnet, e.g., the Restricted Subset 110, and optionally also on less-restricted subnet.

Network Filter 230 is optionally included on the same computing device as DHCP Server Software 210, and can run within the same process as DHCP Server Software 210 or as part of a network protocol stack. Network Filter 230 is configured to manipulate DHCPDISCOVER packets responsive to assessment results received from GateKeeper 125, if the DHCPDISCOVER packets meet certain CONTROL CRITERIA. The CONTROL CRITERIA defines, for example, (i) the DHCP option parameters and values in DHCPDISCOVER packets that indicate whether the corresponding endpoint (e.g., Endpoint 130) needs a security assessment, and (ii) the configuration information required to select the restricted or less-restricted subnets responsive to the assessment. The CONTROL CRITERIA may specify that the presence or absence of one or more specific parameters in the DHCP options within a DHCPDISCOVER packet indicate an assessment should take place. These specific parameters can then be used to determine whether an instance of Endpoint 130 needs a security assessment. In some embodiments, these one or more parameters include a relay IP address that is either within or not within specified ranges or lists of IP addresses. In some embodiments, these one or more parameters include a hardware address that is either within or not within specified ranges or lists of hardware addresses. Typically, Network Filter 230 obtains the ranges, lists, fields and instructions in the CONTROL CRITERIA by extracting the information from a configuration file or, as described further herein, in a communication from the DHCP server. Network Filter 230 may include firmware, hardware and/or software.

In some embodiments, the scopes within Address Allocation Table 220 are associated with the presence, absence, or value of one or more DHCP option parameters. In these embodiments, DHCP option parameters may be received by DHCP Server 160 as part of the contents of DHCPDISCOVER packets. In these cases, Computing Instructions 250 are configured to select an IP address (for inclusion in a DHCPOFFER packet) from address range within the restricted subnet if a DHCP option parameter associated with the restricted subnet is present in the DHCPDISCOVER packet. Otherwise, an IP address from the address range within the less-restricted subnet is selected. Computing Instructions 250 are configured to process DHCP packets and may include firmware, hardware and/or software.

In some embodiments, Network Filter 230 is configured to update DHCPDISCOVER packets meeting the CONTROL CRITERIA with certain combinations of DHCP option parameters responsive to the extent to which Endpoint 130 has satisfied the requirements of one or more assessment. As a consequence of this modification of the DHCPDISCOVER packets, DHCP Server 160 will assign an IP address in a resulting DHCPOFFER packet from the scope associated with a restricted subnet if Endpoint 130 has satisfied the assessment requirements. This IP address will allow Endpoint 130 to access Restricted Subset 110 via Router 120 as specified by ACL 170. If the address of Endpoint 130 has not met the assessment requirements, then Network Filter 230 will typically assure that the DHCP option parameters in the DHCPDISCOVER packet are associated with one of the less-restricted subnets. In this case, Computing Instructions 250 will generate a DHCPOFFER packet including an IP address from the address range associated with the less-restricted subnet.

In alternative embodiments, Network Filter 230 is configured to manipulate the relay IP addresses in DHCPDISCOVER packets that meet the CONTROL CRITERIA responsive to the extent to which Endpoint 130 has satisfied assessment requirements. In these embodiments, Network Filter 230 will first examine an incoming DHCPDISCOVER packet to see if the packet comes from an instance of Endpoint 130 that has satisfied the assessment requirements. If the requirements have been met, Network Filter 230 will record the current relay IP address, then update the relay IP field of the DHCPDISCOVER packet with a new relay IP address such that Computing Instructions 250 will select a scope from Address Allocation Table 220 so that the offered IP address in a DHCPOFFER packet is associated with the less-restricted subnet. The original relay IP address, which was previously saved by Network Filter 230, is inserted in the DHCPOFFER packet resulting from the updated DHCPDISCOVER packet, such that the DHCPOFFER packet will be directed to the original Endpoint 130 via Router 120. For example, after the relay IP address is changed in the DHCPDISCOVER packet, the resulting DHCPOFFER packet will be addressed to the modified relay IP address. Therefore, Network Filter 230 is configured to replace the modified relay IP address in the outgoing resulting DHCPOFFER packet with the original IP address in order to redirect the packet back to the original IP address.

In some embodiments, Network Filter 230 reads CONTROL CRITERIA from the DHCPOFFER packet sent by Computing Instructions 250 responsive to the DHCPDIS- COVER packet. Using DHCPOFFER packets to convey restricted and less-restricted subnet configuration information between Address Allocation Table 220 and Network Filter 230 means that Network Filter 230 does not need to store this information permanently, nor does an administrator need to configure Network Filter 230 separately from other parts of DHCP Server 160 when updating network configurations or security requirements. This method permits changing the CONTROL CRITERIA from the DHCP server without requiring any changes to Network Filter 230. To communicate CONTROL CRITERIA to Network Filter 230, administrators place the information into the DHCP option parameters defined in the DHCP server's scopes, typically corresponding to those restricted subnets that must meet assessment requirements. The CONTROL CRITERIA placed into the DHCP option configurations in the scopes may include relay IP addresses used by the less-restricted scopes, an indication that the restricted scope has a corresponding less-restricted scope, and other parameters. When the incoming DHCPDISCOVER packet is received, the Network Filter 230 inserts a request for the DHCP options associated with the CONTROL CRITERIA into the packet, and the Computing Instructions 250 will convey the CONTROL CRITERIA by adding the requested DHCP option parameters in the resulting DHCPOFFER packet. If the CONTROL CRITERIA indicates that the DHCPDISCOVER packet was received from an Endpoint 130 that has not met the requirements of an assessment, Network Filter 230 stores the identity (e.g. MAC address or the like) and CONTROL CONFIGURATION for Endpoint 130 into a list, and blocks the DHCPOFFER packet from being transmitted further. Endpoint 130 will typically retry sending the DHCPDISCOVER packet because the previous DHCPOFFER packet was blocked. When Network Filter 230 receives the subsequent DHCPDISCOVER packet from Endpoint 130, Network Filter 230 will use the previously saved CONTROL CRITERIA to modify the subsequent DHCPDISCOVER packet so as to place Endpoint 130 on the restricted or less-restricted subnet, in accordance with its compliance to the assessment requirements.

Input/Output 240 is configured to receive DHCPDISCOVER packets from Endpoint 130 and to communicate back DHCPOFFER packets. For example, in various embodiments, Input/Output 240 is a network interface card, a communication port, an Ethernet port, or other connection point between DHCP Server 160 and a network external to DHCP Server 160. In some embodiments, Network Filter 230 is logically disposed (e.g., part of the communication path) between Input/Output 240 and Computing Instructions 250.

An instance of Endpoint 130 that has access to Less-Restricted Subset 105 but not Restricted Subset 110 may optionally undergo an assessment using GateKeeper 125 in order to gain access to all or part of Restricted Subset 110. If the requirements of the assessment are satisfied then the MAC address of Endpoint 130 is added to the list of MAC addresses associated with devices that have passed the assessment. Endpoint 130 may then request a new IP address from DHCP Server 160 and receive a new IP address within the restricted subnet that, responsive to ACL 170, will allow communication with elements of Restricted Subset 110. In some embodiments, an agent running on Endpoint 130 and communication with GateKeeper 125 is configured to make the request for a new IP address.

Figure 3:
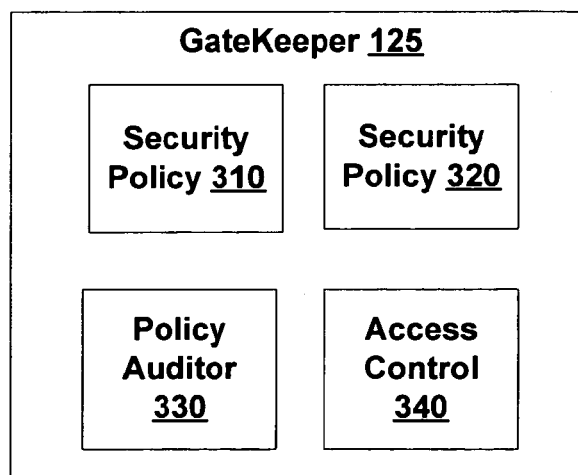
FIG. 3 is block diagram of a network gatekeeper according to various embodiments of the invention.

FIG. 3 is block diagram of GateKeeper 125, according to various embodiments of the invention. GateKeeper 125 includes one or more security policies, such as Security Policy 310 and Security Policy 320, a Policy Auditor and an Access Control 340.

Access Control 340 is configured to manage storage of the list of MAC addresses are associated with devices that have passes the requirements of Security Policies 310 or 320. This list may be stored on DHCP Server 160 or GateKeeper 125. Access Control 340 is responsive to Policy Auditor 330 included in GateKeeper 225. Policy Auditor 330 is configured to receive a request for access to Restricted Subset 110 from Endpoint 130, to determine which of Security Policy 31 or optional Security Policy 32 applies to the current request, to perform a assessment of Endpoint 130 based on the appropriate member of Security Policies 310 and 320, and to notify Access Control 340 if the assessment is passed and that the MAC address of Endpoint 130 may be added to the MAC address list. Access Control 340 adds the MAC address to the MAC address list.

Figure 4:
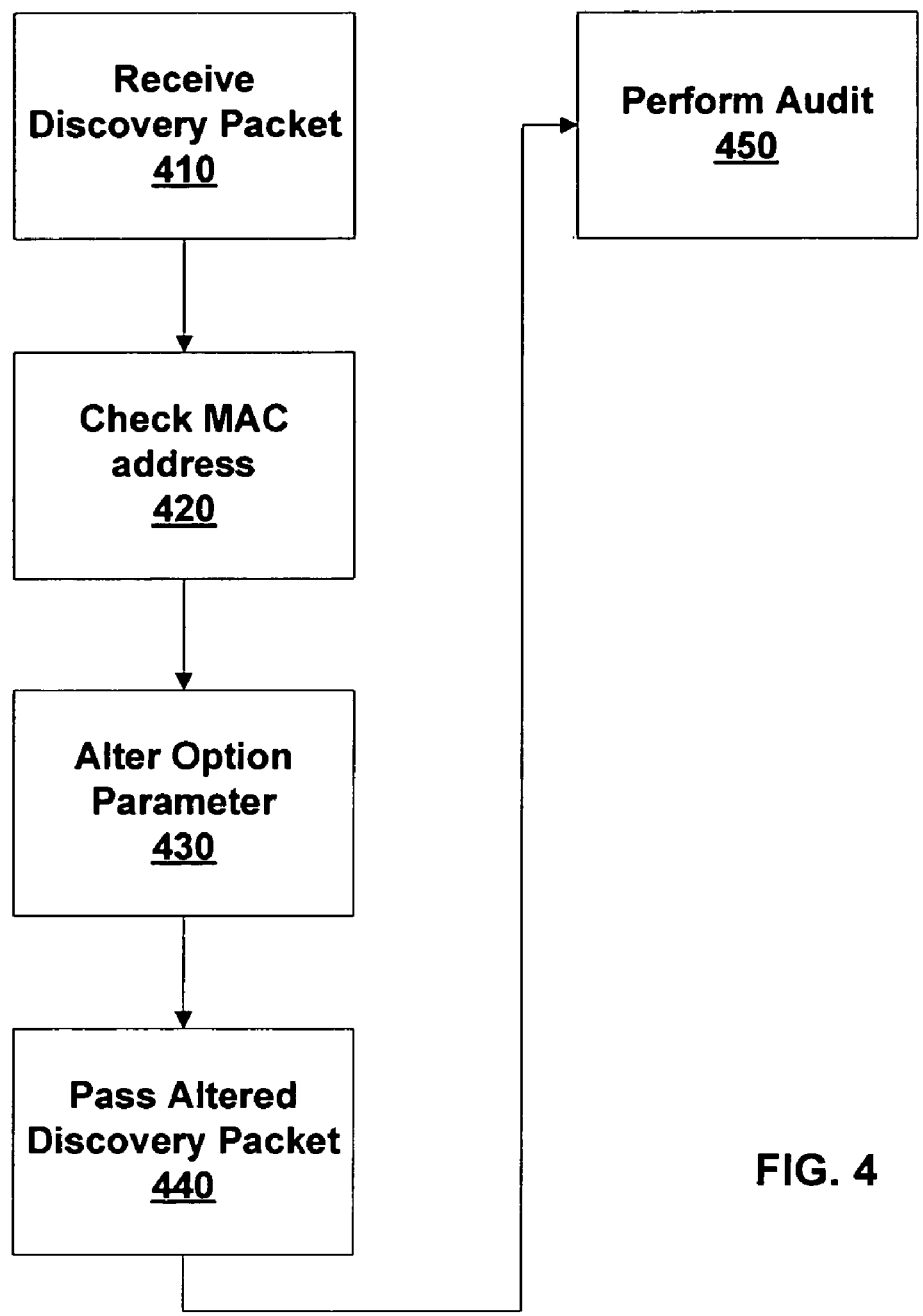
FIG. 4 illustrates a method of granting access to a secure subnet according to various embodiments of the invention.

FIG. 4 illustrates a method of granting access to a secure subnet according to various embodiments of the invention. In these embodiments, Network Filter 230 receives a DHCPDISCOVER packet from Endpoint 130 via Router 120 in a Receive Discovery Packet Step 410. The received DHCPDISCOVER packet includes the MAC address of Endpoint 130 and a relay IP address, a segment of which is typically associated with Router 120. Router 120 includes ACL 170 characterizing Less-Restricted Subset 105 and Restricted Subset 110.

In a Check MAC Address Step 420, Network Filter 230 determines if the MAC address included in the DHCPDISCOVER packet received in Receive Discovery Packet Step 410 is included in the list of MAC addresses associated with devices qualified to access Restricted Subset 110 of Protected Network 100.

In an Alter Option Parameter Step 430, Network Filter 230 alters a DHCP option parameter of the received DHCPDISCOVER packet responsive to whether the MAC Address received in Receive Discovery Packet Step 410 is included in the list of MAC addresses associated with devices qualified to access Restricted Subset 110. The altered DHCP option parameter is configure for controlling whether Computing Instructions 250 will offer an IP address within the less-restricted subnet and associated with Less-Restricted Subset 105, or an IP address within the restricted subnet and associated with Restricted Subset 110.

In a Pass Altered Discovery Packet Step 440, Network Filter 230 passes the altered DHCPDISCOVER packet to Computing Instructions 250 of DHCP Server 160. DHCP Server 160 is configured to respond to the altered DHCPDISCOVER packet with an IP address within the restricted subnet or the less-restricted subnet responsive to the altered option parameter. Whether the IP address is within the restricted subnet or the less-restricted subnet will determine the ability of Endpoint 130 to access the Less-Restricted Subset 105 or Restricted Subset 110 as determined by ACL 170. For example, an IP address within the less-restricted subnet will result in access to Less-Restricted Subset 105 but not Restricted Subset 110. Using this IP address, Endpoint 130 will be able to access Less-Restricted Subset 105 but not Less-restricted subset 100, due to the configuration of ACL 170.

If Endpoint 130 is provided with an IP address that does not allow access to Restricted Subset 110, Endpoint 130 may request an assessment from GateKeeper 125. In response to this request, GateKeeper 125 may perform an assessment in an optional Perform Audit Step 450. If this assessment is successful, an agent on Endpoint 130 may cause Steps 410 through 440 to be repeated in order to receive an IP address that does allow access to Restricted Subset 110 via Router 120.

Figure 5:
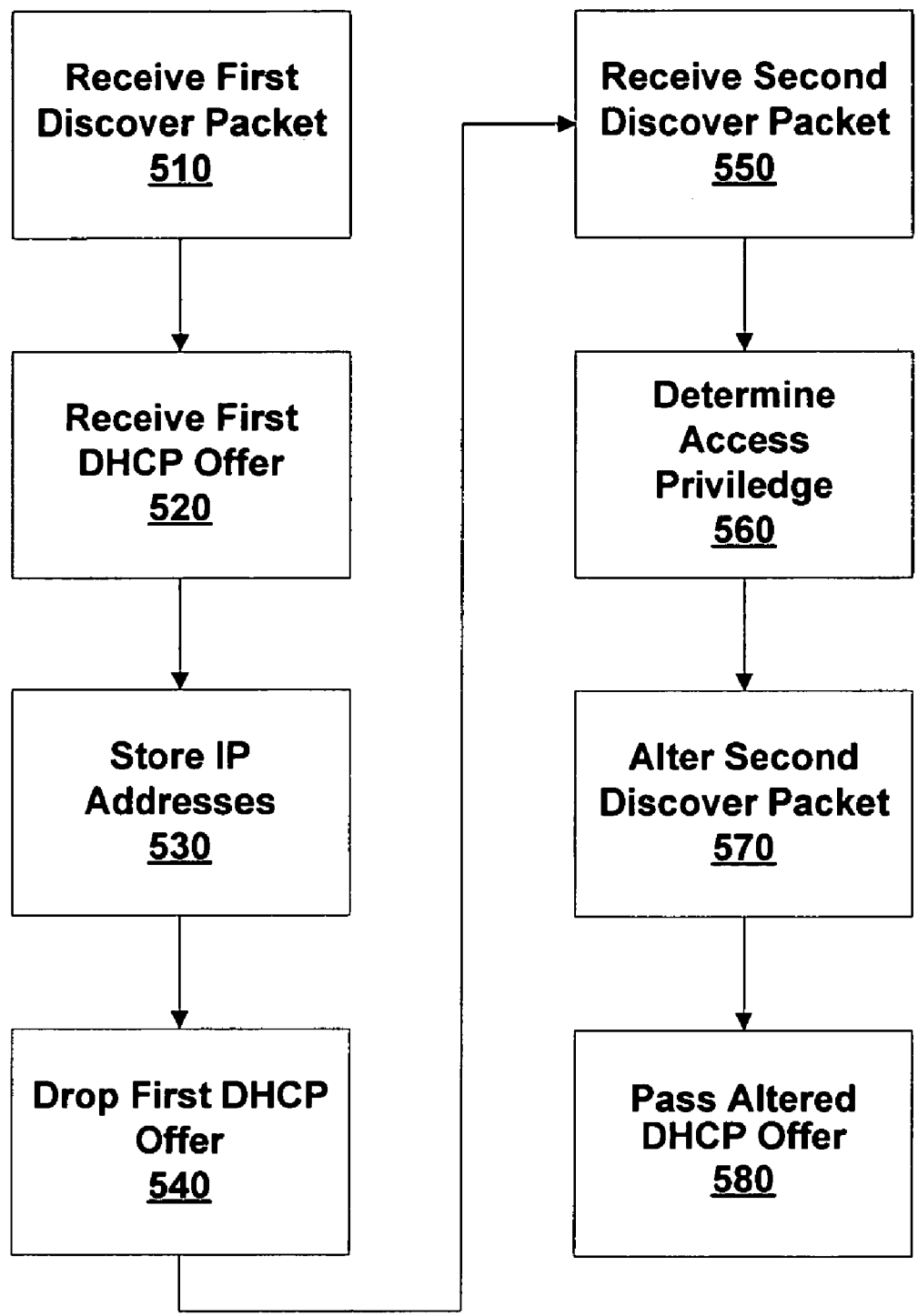
FIG. 5 illustrates an alternative method of granting access to a secure subnet according to various embodiments of the invention.

FIG. 5 illustrates an alternative method of granting access to Restricted Subset 110 according to various embodiments of the invention. In these embodiments, a relay IP address associated with Router 120 is modified to determine which IP address DHCP Server 160 will include in a DHCPOFFER packet, and thereby to determine the access privileges that Endpoint 130 will have.

In a Receive First Discover Packet Step 510, a first DHCPDISCOVER packet is received by Network Filter 230 via Router 120 from Endpoint 130. The DHCPDISCOVER packet typically includes the MAC address of Endpoint 130 and a relay IP address associated, in part, with Router 120. Router 120 is associated with at least a first relay IP address associated with a restricted subnet and a second relay IP address associated with a less-restricted subnet.

In a Receive First DHCPOFFER Step 520 a first DHCPOFFER packet, responsive to the first DHCPDISCOVER packet, is received by Network Filter 230. The DHCPOFFER packet includes the MAC address of Endpoint 130 and information (e.g., ACCESS CRITERIA) regarding the security status associated with that MAC address. This information is placed in the DHCPOFFER packet by Computing Instructions 250 may be in the form of a DHCP option or any other data within the DHCPOFFER packet.

In a Store IP Addresses Step 530 the information, regarding security status received in Receive First DHCPOFFER Step 530 is stored by Network Filter 230 in association with the MAC address of Endpoint 130. This storage is optionally local to Network Filter 230

In a Drop First DHCPOFFER Step 540, the DHCPOFFER packet received in Receive First DHCPOFFER Step 520 is dropped (e.g., terminated and not forwarded).

Receive First Discover Packet Step 510 through Drop First DHCPOFFER Step 540 are used to convey the security status associated with a MAC address, and/or optionally other configuration information, to Network Filter 230. In alternative embodiments, this information may be conveyed through other means. For example, via a table accessible to both Access Control 340 and Network Filter 230. These steps are therefore optional.

In a Receive Second Discover Packet Step 550 a second DHCPDISCOVER packet is receive at Network Filter 230 from Endpoint 130. The second DHCPDISCOVER packet is optionally identified as being a second request from the same source as the request received in Receive First Discover Packet 510 because it includes the same MAC address of Endpoint 130.

In a Determine Access Privilege Step 560 Network Filter 230 determines if the MAC address of Endpoint 130 is included in the list of MAC addresses of devices qualified to access Restricted Subset 110 of Protected Network 100.

In an Alter Second Discover Packet Step 570 the received second DHCPDISCOVER packet is altered by changing the relay IP address of the second DHCPDISCOVER packet such that it reflects a relay IP address associated with restricted subnet of Router 120, if the MAC address of Endpoint 130 is included in the list of MAC addresses of devices qualified to access Restricted Subset 110. Alternatively, if the MAC address of Endpoint 130 is not included in this list of MAC addresses, then the relay IP address of the second DHCPDISCOVER packet is changed to reflect a relay IP address associated with the less-restricted subnet. The associations between relay IP addresses and the restricted subnet and less-restricted subnet are reflected in the configuration of Router 120 as well as Address Allocation Table 220. The associations between relay IP addresses and the restricted subnet and less-restricted subnet are optionally conveyed to Network Filter 230 via Steps 510 through 540 of FIG. 5.

Network Filter 230 passes the DHCPDISCOVER packet to Computing Instructions 250. Computing Instructions 250 are configured to select an IP address, for inclusion in an DHCPOFFER packet, from Address Allocation Table 220 responsive to the relay IP address altered in Alter Second Discover Packet Step 570. If the altered relay IP address is associated with the restricted subnet then the retrieved IP address will be within the scope of the restricted subnet. If the altered relay IP address is associated with the less-restricted subnet then the retrieved IP address will be within the scope of the less-restricted subnet.

In a Pass Altered DHCPOFFER Step 580, the DHCPOFFER packet prepared by Computing Instructions 250 is received by Network Filter 230. If necessary, the relay IP address within the DHCPOFFER packet is replaced by the original relay IP address, such that the DHCPOFFER packet may be directed back to Endpoint 130 via Router 120. This altered DHCPOFFER packet is then passed on by Network Filter 230 for delivery to Endpoint 130.

Several embodiments are specifically illustrated and/or described herein. However, it will be appreciated that modifications and variations are covered by the above teachings and within the scope of the appended claims without departing from the spirit and intended scope thereof. For example, the methods described herein may be used to cancel access to a restricted network if an endpoint fails a subsequent security assessment. Further, steps 510 through 540 of FIG. 5 are optionally followed by the methods of FIG. 4, rather than steps 550 through 580 of FIG. 5. Further, the systems and methods discussed herein are optionally embodied in the form of computing instructions stored on computer readable media. These computing instructions may be divided into code segments configured to perform method steps.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. A method of controlling access to a protected network, the method comprising:

receiving first endpoint information from an agent running on an endpoint, the first endpoint information including a MAC address of the endpoint and information characterizing the endpoint;

receiving a DHCPDISCOVER packet with the MAC address of the endpoint at an input of a DHCP server via a router, the router including an access control list characterizing a restricted subnet of the protected network, the restricted subnet accessible to endpoints with an IP address in a first address range but not accessible to endpoints with an IP address in a second address range;

altering the DHCPDISCOVER packet received at the input, the alteration being responsive to the first endpoint information having met requirements of a security assessment;

passing the altered DHCPDISCOVER packet to a processor configured to execute computing instructions for generating a DHCPOFFER packet;

executing the computing instructions, wherein execution of the computing instructions by the processor generates the DHCPOFFER packet responsive to the alteration made in the DHCPDISCOVER packet, the DHCPOFFER packet including an IP address associated with the first address range if the endpoint information has met the requirements of the security assessment, the DHCPOFFER packet including an IP address associated with the second address range if the endpoint information has not met the requirements of the security assessment;

receiving second endpoint information from the agent as a result of the agent detecting changes at the endpoint; and using the second endpoint information in a subsequent security assessment.

2. The method of claim 1, wherein the restricted IP range and the less restricted IP range represent different subnets.

3. The method of claim 1, wherein the restricted IP range and the less restricted IP range are included in a same subnet.

4. The method of claim 1, further comprising setting an access control list to allow access to the restricted subnet for a packet that includes the IP address associated with the restricted subnet and to prevent access to the restricted subnet for a packet that includes the IP address associated with the less restricted subnet.

5. The method of claim 1, wherein the security assessment includes a requirement that an antivirus program is current.

6. The method of claim 1, wherein the security assessment includes a requirement concerning a specific operating system version.

7. The method of claim 1, wherein the security assessment includes a requirement concerning a specific operating system patch.

8. The method of claim 1, wherein the security assessment includes a requirement concerning monitoring devices connected to the endpoint.

9. The method of claim 1, further comprising updating the endpoint software using a command sent to the agent.

10. The method of claim 9, further comprising remotely updating the agent.

11. The method of claim 9, wherein the security assessment includes a requirement concerning a specific operating system.

12. The method of claim 11, wherein the security assessment includes a requirement concerning a specific operating system patch.

13. The method of claim 11, wherein the security assessment includes a requirement that an antivirus program is current.

14. A method of controlling access to a protected network, the method comprising:

receiving endpoint information from an agent running on an endpoint, the endpoint information including a MAC address of the endpoint and information characterizing the endpoint;

receiving a DHCPDISCOVER packet with the MAC address of the endpoint at an input of a DHCP server via a router, the router including an access control list characterizing a restricted subnet of the protected network, the restricted subnet accessible to endpoints with an IP address in a first address range but not accessible to endpoints with an IP address in a second address range;

altering the DHCPDISCOVER packet received at the input by including a DHCP option with a value, the value being responsive to the endpoint information having met requirements of a security assessment;

passing the altered DHCPDISCOVER packet to a processor configured to execute computing instructions for generating a DHCPOFFER packet;

executing the computing instructions, wherein execution of the computing instructions by the processor generates the DHCPOFFER packet responsive to the alteration made in the DHCPDISCOVER packet, the DHCPOFFER packet including an IP address associated with the first address range if the endpoint information has met the requirements of the security assessment, the DHCPOFFER packet including an IP address associated with the second address range if the endpoint information has not met the requirements of the security assessment.

15. The method of claim 14, further comprising receiving second endpoint information from the agent as a result of the agent detecting changes at the endpoint and using the second endpoint information in a subsequent security assessment.

16. The method of claim 15, further comprising updating the endpoint software using a command sent to the agent.

17. The method of claim 16, further comprising remotely updating the agent.

18. The method of claim 16, wherein the security assessment includes a requirement that a antivirus program is current.

19. The method of claim 16, wherein the security assessment includes a requirement concerning a specific operating system patch.

* * * * *